(12) United States Patent
Eissfeller

(10) Patent No.: US 6,330,966 B1
(45) Date of Patent: Dec. 18, 2001

(54) AUTOMATIC WELDING MACHINE

(75) Inventor: Roman Eissfeller, Immendingen (DE)

(73) Assignee: Roman Eissfeller GmbH, Immendingen (DE)

( * ) Notice: Subject to any disclaimer, the term of this patent is extended or adjusted under 35 U.S.C. 154(b) by 0 days.

(21) Appl. No.: 09/508,593

(22) PCT Filed: Sep. 9, 1998

(86) PCT No.: PCT/DE98/02660

§ 371 Date: Nov. 6, 2000

§ 102(e) Date: Nov. 6, 2000

(87) PCT Pub. No.: WO99/12696

PCT Pub. Date: Mar. 18, 1999

(30) Foreign Application Priority Data

Sep. 10, 1997 (DE) .............................. 197 39 720

(51) Int. Cl.[7] .................................................. B23K 15/02
(52) U.S. Cl. ........................... 228/8; 228/102; 219/125.1
(58) Field of Search ............................... 228/8, 47.1, 102; 700/190, 191, 192; 219/125.1, 125.11, 125.12, 126; 901/42

(56) References Cited

U.S. PATENT DOCUMENTS

| | | | |
|---|---|---|---|
| 4,577,796 | * | 3/1986 | Powers et al. . |
| 4,621,333 | * | 11/1986 | Watanabe . |
| 4,677,273 | * | 6/1987 | Colegrove et al. . |
| 4,848,179 | * | 7/1989 | Ubhayakar . |
| 4,891,765 | * | 1/1990 | Hatori et al. . |
| 5,743,705 | | 4/1998 | Eissfeller .............................. 414/749 |
| 5,825,655 | * | 10/1998 | Nakagawa et al. . |
| 5,914,876 | * | 6/1999 | Hirai . |
| 6,008,468 | * | 12/1999 | Tanaka et al. . |
| 6,167,328 | * | 12/2000 | Takaoka et al. . |
| 6,212,443 | * | 4/2001 | Nagata et al. . |

FOREIGN PATENT DOCUMENTS 0 701 884    9/1995 (EP) .

OTHER PUBLICATIONS

International Publication No. WO 99/38266, "Intelligent Radio," Jul. 29, 1999.

* cited by examiner

Primary Examiner—Tom Dunn
Assistant Examiner—Jonathan Johnson
(74) Attorney, Agent, or Firm—Samuels, Gauthier & Stevens, LLP

(57) ABSTRACT

The invention relates to an automatic welding machine comprising an X-Y-Z moving mechanism (100) with three linear motion devices each driven by a motor (101, 102, 103) with a self-locking drive. The X-Y-Z moving mechanism (100) has a handle (41) with integrated sensors (a . . . f) which is to be held by an operator. The sensors (a . . . f) are coupled to a control unit (300) and the motors (101, 102, 103) of the X-Y-Z moving mechanism (100) can be moved exclusively in accordance with the output signals of said sensors (a . . . f).

12 Claims, 3 Drawing Sheets

AUTOMATIC WELDING MACHINE

BACKGROUND OF THE INVENTION

The invention relates to an automatic welding machine with a baseplate for placing the workpieces that are to be welded, and with a welding head that can move in the A-B-C direction and that is part of a welding apparatus, the welding head being coupled to an X-Y-Z motion mechanism for the automatic motion of the welding head along the workpieces according to the norm of a control routine that has been prescribed by a preceding teach-in-process and that has been stored in a control device.

Automatic welding machines are generally known and are used to perform welding processes on workpieces automatically in accordance with a prescribed program. By an automatic welding machine one generally understands the collection of all the equipment necessary for the mass production of welds on industrial products. Automatic welding machines in particular comprise clamping mechanisms and adjustment equipment for the workpieces or the welding tools, as well as equipment for guiding the welding electrodes or welding torches in the case of, gas flame welding, and the necessary supplementary materials. Automatic welding machines are frequently controlled by external equipment, which is designed as a separate unit. In the meantime, automatic welding machines are also known in which this machine itself contains an operating unit.

All automatic welding machines have in common that the welding electrodes or welding torches are guided automatically in accordance with a prescribed control routine. Due to the excellent welding results with automatic welding machines in comparison with manual welding, a trend has developed in the meantime to use automatic welding machines—as much as possible—not only for welding large parts, such as e.g. in automated linked lines in car body factories, but also for smaller workpieces.

Such automatic welding machines are especially needed where welds need to be very precise and the welding processes must be very reproducible. Consequently, automatic welding machines are especially necessary where slow precision welding is needed.

European Patent Application EP 0 701 884 A1 of the applicant already discloses an industrial robot with a movable working arm to handle workpieces and a mechanism to move the working arm. The mechanism controls three linear motion devices which can move the working arm in the X-Y-Z direction. The presence of three such linear motion devices makes it easily possible to move the working arm to a prescribed position. Depending on the point to be approached, the linear motion devices can be moved in their directions of motion completely independently of one another. Besides an X-Y-Z motion mechanism, the working arm itself has a motion device, so that it can be moved back and forth and/or turned independently of the X-Y-Z motion devices. A sensor device, in the form of a rotary encoder, is coupled to each of the motion or linear motion devices of the industrial robot. This sensor device is coupled to the control device, and it senses the motion of the respective motion or linear motion device, and thus also senses the position of the working arm. In their decoupled state, the motion devices and linear motion devices are in a state of equilibrium, and can be moved by hand without the exertion of a large force. In conjunction with the sensor devices, this is used to program the control device. A so-called "teach-in-process" is performed in this connection.

As regards the teach-in-process, express reference is made to the European Patent Application EP 0 701 884 A1 for the purpose of the disclosure. The industrial robot described there is indeed also suited in principle to perform welding processes on workpieces. However, the known industrial robot has the problem that very slow precision welding is not so readily possible, because, during the teach-in-process, the operator himself must work very exactly while simultaneously moving the X-Y-Z motion devices and the motion device coupled to the working head itself.

Consequently, it is the object of the invention to create an automatic welding machine which permits highly precise welding of workpieces in accordance with a previously executed teach-in-process.

SUMMARY OF THE INVENTION

An essential requirement of the invention is for the X-Y-Z motion mechanism to have three motors, one for each of the three X-Y-Z directions, and for each of these motors to be equipped with a self-locking gear mechanism. The X-Y-Z motion mechanism consequently cannot be moved manually. The X-Y-Z motion mechanism has a handle with integrated sensors and is intended as a sort of control stick for the operator.

The handle preferably is shaped in such a way that it gives the operator the impression that he himself holds the X-Y-Z motion mechanism in his hand, and thus forms a part of this motion mechanism. The handle is suitably placed at the front end of a holding tube which is seated on the Z axis. The sensors inside the handle are coupled to a control device such that the motors of the X-Y-Z motion mechanism move exclusively according to the measure specified by the output signals from the sensors.

In a further development of the invention, the X-Y-Z motion mechanism has a coupling device which, when decoupled, nevertheless permits manual displacement of the X-Y-Z motion mechanism. Such a further development makes sense if a defect of the X-Y-Z motion mechanism makes it impossible to drive it electrically any longer, and it nevertheless must be moved away from its instantaneous position. In this case, the coupling mechanism is decoupled, and the X-Y-Z motion mechanism is moved by hand. However, the X-Y-Z motion mechanism is coupled in during the teach-in-process, so that manual motion is excluded.

Moving the X-Y-Z motion mechanism exclusively through an electrical drive during the teach-in-process extraordinarily increases the accuracy of the motion of the welding head. This results in a vibration-free, uniform motion of the welding head.

The automatic welding machine suitably is designed in such a way that the control device adjusts the speed of the individual motors in dependence on the amplitude of the signals delivered by the sensors, This has the decisive advantage that, as the operator's s hand exerts more pressure on the handle, the X-Y-Z mechanism moves faster along the direction of the exerted pressure. This enhances the feeling of the operator that he himself moves the X-Y-Z motion mechanism by the pressure which he exerts, although this is not the case. Rather, it is only the output signal of the sensors that causes the control device to let one or another motor run faster or slower.

The inventive automatic welding machine therefore provides a kind of "servocontrol" for the X-Y-Z motion mechanism. Without this "servodrive," the operator could move the very heavy and bulky X-Y-Z motion device only by exerting a very great force, which runs contrary to high-precision welding and the associated high-precision welds.

In a further development of the invention, the handle is shaped box-shaped at least approximately, and has a separate sensor on each of its walls. For example, these sensors can be pressure sensors.

In a suitable further development of the invention, the welding head of the automatic welding machine is a welding torch tip, so that the automatic welding machine can be used for gas flame welding. However, it would also be conceivable to provide an electrode welding head instead of a welding torch tip. However, in this case it is necessary for the melting metal electrode to be readjusted again and again in its guidance along the workpiece. Regardless of the design of the welding bead, it is seated on an A-B-C motion mechanism, which can be moved independently of the X-Y-Z motion mechanism, except for the fact that it is coupled to the latter.

In a further development of the invention, the X-Y-Z motion mechanism has two motion sleds, seated above the base plate, which preferably is a workbench standing on legs. Through these motion sleds, the welding head can be moved in the X and Y direction. The parallel rails of the two motion sleds are orthogonal to one another and suitably are disposed in nearly the same plane. From these two motion sleds, a holding tube leads in the Z direction, in the direction of the workbench. The A-B-C motion mechanism for the welding head is affixed at the end of this holding tube. The conductors leading to the A-B-C motion mechanism of the welding head, that is to the sensors and drive units situated there, are preferably fed through the hollow holding tube, which is aligned in the Z direction.

So that the welding head can be rotated 360°, a holding plate, which itself can move by 360°, is disposed at the upper end of the holding tube, which is arranged in the Z direction. The holding plate is connected to the welding head through a connection element arranged inside the holding tube. The feed cable is conducted to this holding plate through a cable boom affixed to the upper end of a working cabinet of the automatic welding machine.

According to an advantageous embodiment of the invention, the automatic welding machine has two-hand operation available for the teach-in process of the control routine, which sets the standard for the subsequent, automatic welding processes. The abovementioned handle with its integrated sensors is here gripped by one hand of the operator, and the welding head of the automatic welding machine is gripped by his other hand.

For example, the operator's left hand grips the handle and moves the X-Y-Z motion device by pressing the handle in the desired direction, such that the welding head of the automatic welding machine covers larger distances in the appropriate direction. The operator's right hand, by contrast, grips the welding head itself, and pivots it in such a way that the desired weld can be executed at the workpiece. These are relatively small and short motions, which can be sensed by the sensors on the A-B-C motion mechanism and can be conducted to the control device. After the weld on the trial workpiece has been finished by hand with the automatic welding machine, and the teach-in process is concluded, the control device retrieves the previously learned motion sequences of the X-Y-Z motion devices and of the A-B-C motion devices from memory, and subsequently executes exactly the same motions automatically.

BRIEF DESCRIPTION OF THE DRAWING

The inventive automatic welding machine is explained below, by way of example, in connection with four figures.

In the subsequent figures, the same reference symbols designate the same parts with the same meaning, unless otherwise specified.

DETAILED DESCRIPTION OF THE INVENTION

Figure 1:
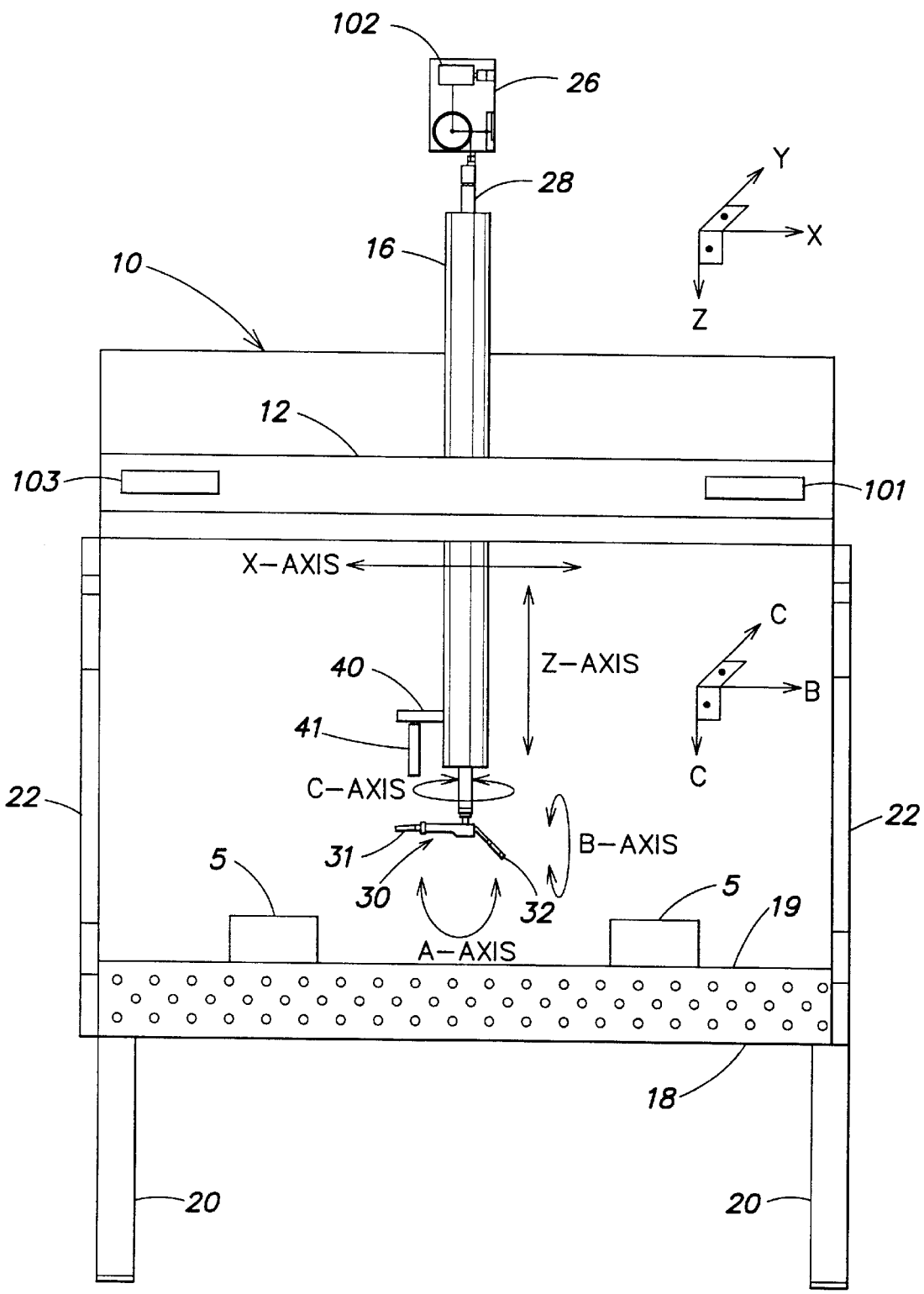
FIG. 1 shows an inventive automatic welding machine, in a top view from the front.
Figure 2:
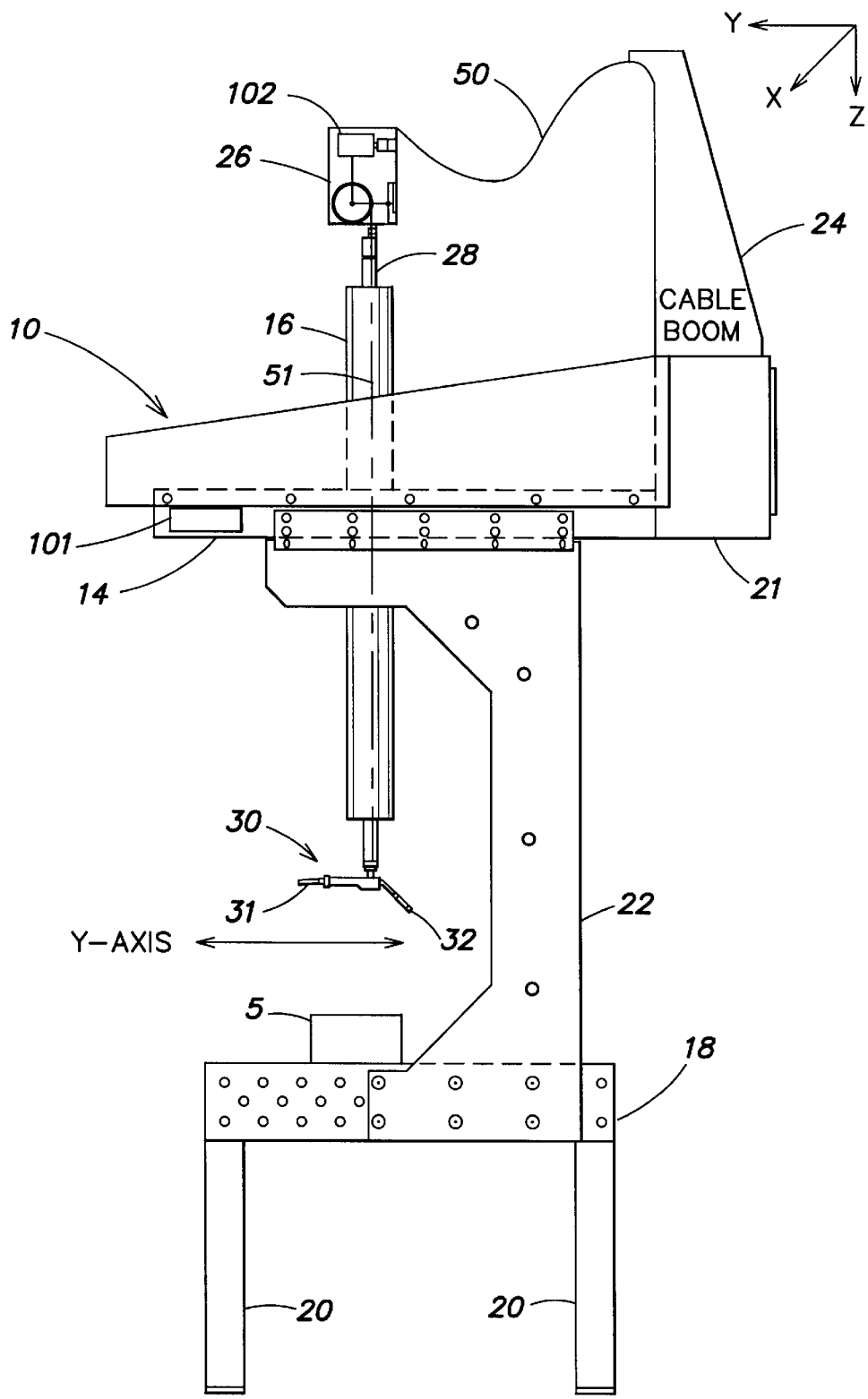
FIG. 2 shows the automatic welding machine of FIG. 1, in a top view from the side.

The embodiment of an automatic welding machine shown in FIG. 1 shows a working cabinet 10 in a top view from the front. The working cabinet 10 essentially consists of a workbench 18, with the workpieces 5 which are to be welded lying on the work surface 19 of said workbench. The workbench 18 stands On the legs 20. At the end of the workbench 18, to the left and right, the side walls 22 extend upward. As the side view of FIG. 2 shows, they are screwed to the sides of the workbench 18. The side walls 22 are approximately U-shaped. One leg of this U-shaped side part 22 is laterally screwed onto the workbench 18, while the other leg of the U-shaped side part 22 is screwed onto an upper rail part. The like holds for the opposite side part 22. Two X sleds 12 and Y sleds 14, arranged orthogonal to one another, with respectively two parallel rails, are disposed at a distance from and parallel to the work surface 19 of the workbench 18. A holding tube 16, which can move in the Z direction, runs on these two sleds 12, 14.

A welding head 30 is seated on that end of the holding tube 16, which faces the workbench 18. In the present embodiment, the welding head is designed as a welding torch. This welding torch 30 has a welding torch tip 31 and a connection line 32 for feeding in the welding gas. The entire welding head 30 itself again can be moved about three axes, here the A axis, the B axis, and the C axis, as is also shown by the arrows in FIG. 1. The entire welding head together with the A-B-C motion mechanism is mounted on a displacement rod 28, which can move in the Z direction.

A holding plate 26 is disposed on that end of the displacement rod 28 or of the holding tube 16, which is situated opposite the welding head. A motor 102 for the Z displacement of the displacement rod 28 is disposed on the holding plate 26. In addition, other electronics can be accommodated on this holding plate 26. The holding tube 16 is moved in the Y and X direction through the motors 101 and 103, which are only shown schematically in FIG. 1.

The motors 101, 102, and 103 are each coupled to self-locking gear mechanisms, which make it impossible for the operator to move the X-Y-Z motion mechanism manually.

However, the automatic welding machine suitably contains a coupling device, which is not shown here, which makes it possible nevertheless to move the X-Y-Z motion mechanism manually in case of trouble. However, if the X-Y-Z motion mechanism operates properly, such a manual motion is excluded. Rather, motion in the X, Y, or Z direction is possible only by supplying power to the motors 101, 102, and 103 provided for this purpose.

Figure 3:
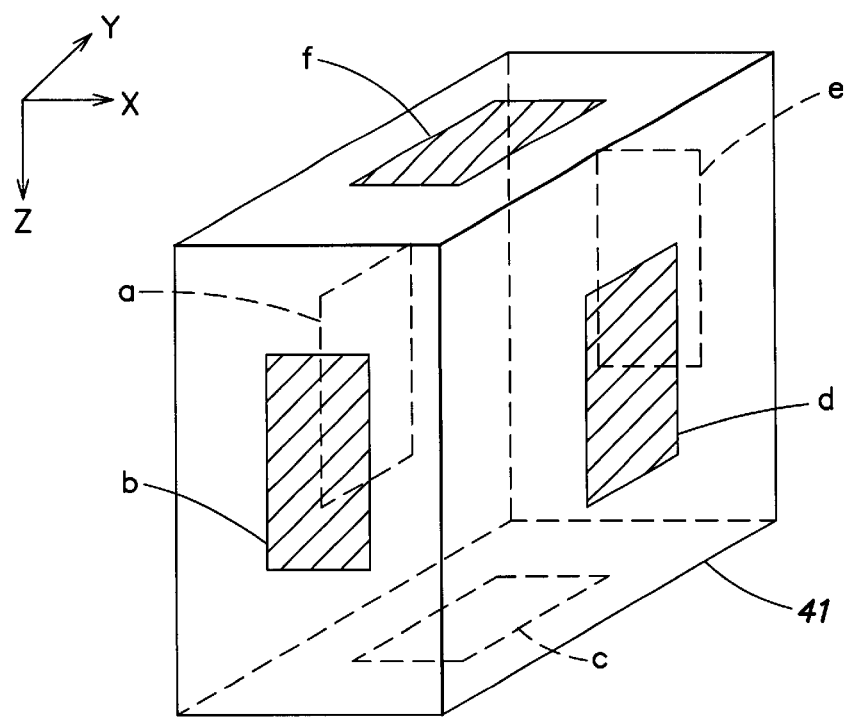
FIG. 3 is a schematic representation of the handle of the automatic welding machine of FIGS. 1 and 2.

As can be seen clearly in FIG. 1, the handle 41 is situated at the front end of the holding rod 16. This handle is solidly fastened to the holding tube 16 by a mount 40. This handle 41 can have a structure which is at least approximately box-shaped. It has sensors in its interior, as FIG. 3 shows schematically.

The handle, designated by reference symbol 417 is there actually box-shaped and has a special sensor a, b, c, d, e, and f on each of its walls, in this case a pressure sensor. If an operator grips this handle 41 and presses it, for example, rearward in the Y direction, this is sensed by the pressure sensor b. Since all the sensors a, b, c, d, e, and f are connected to the control device, the control device knows that the operator wishes to move the X-Y-Z motion mechanism in the Y direction. The control device generates appropriate control signals for the drive motor 101, which is responsible for motion in the Y direction. The like holes for the other motors.

The control device also responds to the amplitude of the signals arriving from the sensors a to f, and causes the motors 101, 102, 103 to run faster or slower in accordance with the detected amplitude. As a result, when the operator presses more strongly in a given direction, he will cause the X-Y-Z motion mechanism to move faster in the corresponding direction. This enhances the impression of the operator that his own pressure directly puts the X-Y-Z motion mechanism into motion, without an intermediary electronics, although this is not the case. The control device, together with the motors and the sensor devices, serves as a servo-drive for the X-Y-Z motion mechanism.

The motors 101, 102, and 103 are coupled to the respective displacement device, e.g. displacement rods or displacement chains, via a self-locking gear mechanism, preferably a self-locking worm gear mechanism with a step down ratio of for example 1:40. This self-locking gear mechanism causes the X-Y-Z motion mechanism to be immovable manually except for the above-mentioned case of trouble.

Figure 4:
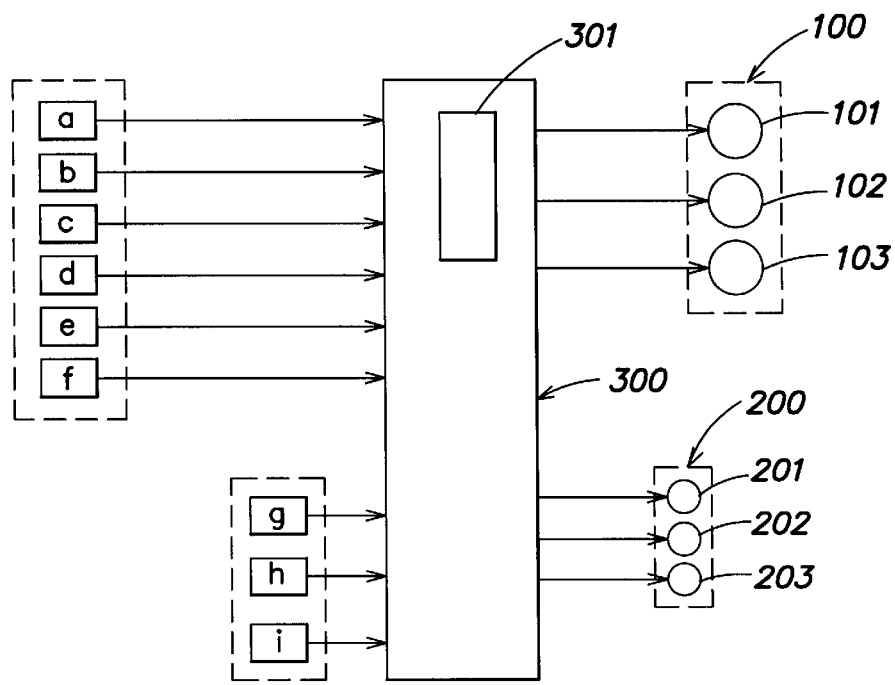
FIG. 4 is a schematic block circuit diagram of the control device which controls the automatic welding machine of FIGS. 1 and 2.

FIG. 4 shows a very schematic block circuit diagram of the inventive automatic welding machine. The control device bears the reference symbol 300. The X-Y-Z motion mechanism 100, with its motors 101, 102, and 103, is connected to the control device 300. Control signals from the control device 300 cause the motors 101, 102, and 103 to turn in the prescribed directions with a prescribed speed. The output signals from the sensors a, b, C, d, e, f during the teach-in-process set the standard for this rotation of the motors 101, 102, 103. After the teach-in-process has been completed, the signals outputted by the sensors a to f are stored in a memory 301 of the control device 300. After the teach-in-process for the welding process has been completed, the subsequent welding processes are performed automatically by retrieving the data stored in the memory 301 of the control device 300.

The A-B-C motion mechanism 200 is activated in similar fashion. The drive motors 201, 202, 203 cause motion, preferably rotational motion, about the A axis, B axis, and C axis. The individual axes A, B, and C are coupled to suitable rotary encoders g, h, i. These rotary encoders g, h, i are likewise connected to the control device 300. During the teach-in phase, these rotary encoders g, h, i record the motion of the welding head, which is moved, for example, by the right hand of the operator. The data from the rotary encoders g, h, and i are again stored in the memory 301 of the control device 300. During the subsequent, automatic welding process, these data are retrieved from the memory 301 so as to activate the motors 201, 202, 203.

The automatic welding machine shown in FIGS. 1 and 2 is operated as follows for the automatic welding process.

First, an operator grips the handle 41 with his left hand, and grips the welding torch 30 with his right hand. The workpiece 5, which is to be welded, has already been placed in the position in which it is to be welded. The control device is switched to program mode, and the manual welding process begins. With his left hand, the operator presses the handle 41 in such a way that the X-Y-Z mechanism reaches the desired position through the power which is caused to be supplied to the individual motors 101, 102, 103. With his right hand, the operator moves the welding torch 30 in such a way that the welding torch tip 31 makes the required welds on the workpiece. After the welding of workpiece 5 has been finished, the operator can move the X-Y-Z mechanism to the next workpiece 5, situated on the workbench 18, by appropriately activating the handle 41. He can then execute a new welding process on the new workpiece 5. After welding has been finished on the workpieces 5 which are situated on the workbench 18, the programming mode is terminated.

Then the operator switches over to automatic mode, removes the finish welded workpieces 5 from the workbench 18, and places new workpieces at the positions where the other workpieces 5 lay previously. After a start command initiated by the operator, the control device 300 retrieves the data, previously stored during the teach-in mode, from the memory 301, and controls the individual motors 101, 102, 103 and 202, 201, and 203 in such a way that the automatic welding process is executed.

For the sake of completeness, it should be added as a supplement, with reference to FIG. 2, that the holding plate 26 at the upper end of the holding tube 16 can move by 360. As the holding plate 26 moves about its own axis, the displacement rod 28, situated in the holding tube 16, also turns correspondingly. This results in the welding head moving about the Z axis. The housing part 21, which is fastened on the top side of the workbench 10, extends into a cable boom 24, which preferably can be tilted out of the way. This cable boom 24 serves to lead the feed lines 50 movably to the holding plate 26. Inside the holding tube 16 there also run feed lines 51 to the motors and angle pick-ups or rotary encoders of the A-B-C motion device, which are shown in FIG. 2 for the sake of better clarity.

What is claimed is:

1. An automatic welding machine comprising a baseplate for placing workpieces that are to be welded, and with a welding head that can move in an A-B-C direction and that is part of a welding apparatus, the welding head being coupled to an X-Y-Z motion mechanism for the automatic motion of the welding head along the workpieces according to the norm of a control routine that has been prescribed by a preceding teach-in-process and that has been stored in a control device, characterized in that the X-Y-Z motion mechanism includes at least three linear motion devices, each driven by a motor with a self-locking gear mechanism, and in that a handle with integrated sensors for an operator is present on the X-Y-Z motion mechanism, and in that these sensors are coupled to the control device, and in that the motors of the X-Y-Z motion mechanism can be moved exclusively according to the measure of the output signals from the sensors.

2. The automatic welding machine of claim 1, wherein the speed of the motors can be adjusted, through the control device, in accordance with the amplitude of the output signals from the sensors.

3. The automatic welding machine of claim 1, wherein the handle is shaped at least approximately rectangularly, and has a separate sensor at each of its walls.

4. The automatic welding machine of claim 3, wherein the sensors include pressure sensors.

5. The automatic welding machine claim 4, wherein the welding head comprises a welding torch tip, which is seated on an A-B-C motion mechanism, and the A-B-C motion mechanism is coupled to the X-Y-Z motion mechanism, and the two motion mechanisms can move independently of one another.

6. The automatic welding machine of claim 5, wherein the X-Y-Z motion mechanism comprises two motion sleds seated above the baseplate, to move the welding head in the X and Y direction.

7. The automatic welding machine of claim 6, comprising a holding tube pointing in the Z direction, with a welding head coupled to its end, that is arranged from the two sleds of the X-Y-Z motion direction in the direction of the baseplate.

8. The automatic welding machine of claim 7, wherein the handle is disposed at the front end of the holding tube for the Z axis.

9. The automatic welding machine of claim 8, wherein the baseplate comprises a workbench which stands on the legs.

10. The automatic welding machine of claim 9, comprising a cable boom disposed at the upper end of a work cabinet of the automatic welding machine, such that the feed cables are conducted over said cable boom to a holding plate, and in that this holding plate is seated on that end of the holding tube, which faces away from the welding head, and in that the feed lines are conducted through the holding tube in the direction of the welding head of the automatic welding machine.

11. The automatic welding machine of claim 10, wherein the automatic welding machine provides two-hand operation for the teach-in process of the control routine, such that the handle can be gripped by one hand of the operator and the welding head of the automatic welding machine can be gripped by his other hand.

12. The automatic welding machine of claim 11, wherein the X-Y-Z motion device cannot be moved manually.

* * * * *